United States Patent [19]

Herr

[11] 3,787,731
[45] Jan. 22, 1974

[54] ELECTRICALLY INTERLOCKING PUSHBUTTON CIRCUIT WITH ERROR INDICATION

[75] Inventor: Kurt F. Herr, Woodridge, Ill.

[73] Assignee: GTE Automatic Electric Laboratories Incorporated, Northlake, Ill.

[22] Filed: Apr. 6, 1973

[21] Appl. No.: 348,570

[52] U.S. Cl............................ 307/115, 340/175.2 R
[51] Int. Cl........................................... H01h 47/00
[58] Field of Search............. 307/112, 113, 115, 92; 179/175.2 R, 175.21; 200/167 A; 340/331, 292, 252 R; 317/123

[56] References Cited
UNITED STATES PATENTS
3,179,777  4/1965  Rohacs.......................... 200/167 A Primary Examiner—Herman J. Hohauser
Assistant Examiner—M. Ginsburg
Attorney, Agent, or Firm—Bernard E. Franz

[57] ABSTRACT

An electrically interlocking pushbutton circuit with error indication is disclosed, including two locking-type pushbuttons which are electrically interlocked such that a first operated pushbutton must be released before the second can be operated to initiate a related function. If the first pushbutton is not released, a flashing error indication is provided, by means of an indicator lamp associated with each of the pushbuttons.

9 Claims, 1 Drawing Figure

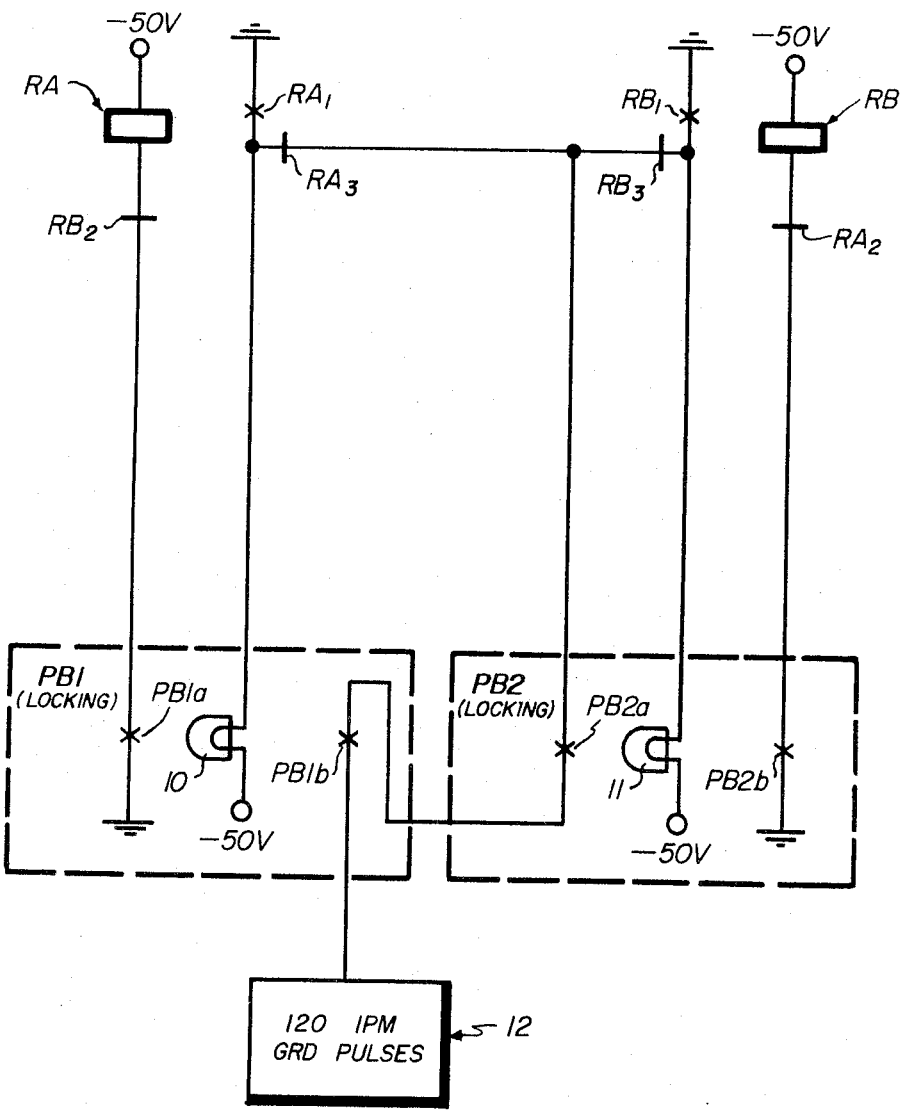

ELECTRICALLY INTERLOCKING PUSHBUTTON CIRCUIT WITH ERROR INDICATION

This invention relates to an electrically interlocking pushbutton circuit with error indication.

BACKGROUND OF THE INVENTION

The electrically interlocking pushbutton circuit with error indication of the present invention has numerous applications where, for example, during testing of various different pieces of equipment or circuits, a first operated pushbutton, which established a first test condition, must be restored prior to operating a second pushbutton which establishes a second test condition, to prevent damaging the test equipment. A particular application is in a test desk used in a telephone exchange, for testing various trunks and/or lines by connecting different test circuits to them. Such a test desk may be of the type disclosed in a copending application entititled "Manually Controlled Connect Matrix," Ser. No. 348,561, filed Apr. 4, 1973, by Kurt F. Herr.

In such an application, as an example, the simultaneous application of +100 volts coin collect voltage and −110 volts coin refund voltage during testing must be prevented. Correspondingly, the application of −15 volts and −150 volts test battery must be prevented. Numerous other similar conditions exist.

In addition to preventing two such test conditions from being simultaneously applied, a testman should also receive an indication that an error was made.

Accordingly, it is an object of the present invention to provide an improved electrically interlocking pushbtton circuit with error indication.

Still another object is to provide such a circuit which is relatively inexpensive, and relatively simple in construction and operation.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the nature and objects of the invention, reference should be had to the following detailed description taken in connection with the accompanying drawing, in which:

The single FIGURE is a schematic illustrating an electrically interlocking pushbutton circuit with error indication exemplary of the invention.

DESCRIPTION OF THE PREFERRED EMBODIMENT

Referring now to the drawing, an electrically interlocked pushbutton circuit with error indication exemplary of the invention is illustrated, and can be seen to include two locking pushbuttons PB1 and PB2 (not shown) of standard construction having contacts $PB1_a$, $PB1_b$ and $PB2_a$, $PB2_b$, respectively. A relay RA having contacts $RA_1$, $RA_2$ and $RA_3$ and an indicator light 10 are associated with the pushbutton PB1, while relay RB having contacts $RB_1$, $RB_2$ and $RB_3$ and an indicator light 11 are associated with the pushbutton $PB_2$, as described more fully below. An energizing source 12 which may be, for example, a 120 IPM ground pulse, is provided for energizing the lights 10 and 11, to provide a flashing error indication. The relays RA and RB have additional contacts for initiating other functions, however, they are not pertinent to the present invention.

When one of the pushbuttons, for example, PB1 is pushed, it closes its normally open contacts $PB1_a$ and $PB1_b$ to extend ground through its normally open contact $PB1_a$ and the normally closed contact $RB_2$ of relay RB to energize the relay RA. At contact $PB1_b$, an error energizing circuit for the lights 10 and 11 is prepared, as more fully described below. Relay RA in operating closes its normally open contact $RA_1$, to extend ground to energize the light 10, and opens its normally closed contacts $RA_2$ and $RA_3$. The light 10 will glow brightly indicating that the pushbutton PB1 has been operated. The contact $RA_2$ opens the energizing circuit for the relay RB, thus preventing it from being energized should the pushbutton PB2 now be operated. The contact $RA_3$ opens the error indicating energizing circuit to the light 10.

If now the pushbutton PB2 is operated to close its normally open contacts $PB2_a$ and $pB2_b$, ground is extended through the contact $PB2_b$ to energize the relay RB, however, with the contact $RA_2$ open, relay RB is not energized. The source 12 is extended through the contacts $PB1_b$ and $PB2_a$, both of which are now closed and through the normally closed contact $RB_3$ to the light 11 to energize it. The light 11 will be flashed at the 120 IPM rate, thus indicating the error inoperating the push-button PB2, prior to restoring the pushbutton PB1.

At this time pushbutton PB2 can be restored, without the first test configuration or function established when the pushbutton PB1 was operated being interrupted. Alternatively, pushbutton PB1 can be restored, and the test configuration or function which is established by operating the pushbutton PB2 will be set up.

If the pushbutton PB2 is operated first, the subsequent operation of pushbutton PB1 will be ineffective, and the light 10 will be caused to flash, as described above.

Accordingly, with this simple arrangement, it can be seen that only one test configuration at a time can be established, by the operation of either the relay RA or RB, and if the other one of the two pushbuttons is operated without first restoring the operated pushbutton, an error indication is provided.

While specific reference is made to a pushbutton, it will be appreciated that any type of switch having contacts operated in the described fashion can be use in the circuit. Accordingly, the term pushbutton is used in a generic sense to cover these types of switches also.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. An electrically interlocking pushbutton circuit with error indication comprising, in combination: a first pushbutton having a relay including a plurality of contacts and a light associated with it, said relay and said light normally being energized when said first pushbutton is operated; a second pushbutton having a relay including a plurality of contacts and a light associated with it, said relay and said light normally being energized when said second pushbutton is operated; an energizing source for energizing said lights to provide an error indication; the arrangement comprising means such that the operation of one of said first and second pushbuttons energizes the relay and the light associated with it, prepares an energizing circuit from said energizing source to said lights, said relay in being energized opening the energizing circuit for the relay associated with the other one of said pushbuttons and opening the prepared energizing circuit from said energizing source to its associated light, and such that the operation of the other one of said first and second pushbuttons without restoring the first closes the prepared energizing circuit from said energizing source to the light associated with the second operated one of said first and second pushbuttons to cause it to light to provide an error indication.

2. The electrically interlocking pushbutton circuit with error indication of claim 1, wherein said energizing source comprises an interrupted source whereby said light associated with the other one of said first and second pushbuttons is caused to flash to provide said error indication.

3. The electrically interlocking pushbutton circuit with error indication of claim 1, wherein said first pushbutton comprises a first and a second normally open contact, said first normally open contact being included in the energizing circuit for the relay associated with said first pushbutton and being closed when the latter is operated to energize said relay, said second normally open contact being included in the energizing circuit for energizing said lights and being closed when said first pushbutton is operated to prepare said energizing circuit for said lights.

4. The electrically interlocking pushbutton circuit with error indication of claim 3, wherein said relay associated with said first pushbutton comprises a normally open contact included in the energizing circuit for said light associated with said first pushbutton, a first normally closed contact included in the energizing circuit for the relay associated with said second pushbutton and a second normally closed contact included in the energizing circuit from said energizing source to said lights, said relay upon being energized closing said normally open contact to light said light associated with said first pushbutton and opening said first and second normally closed contact to thereby open the energizing circuit for said relay associated wtih said second pushbutton and the energizing circuit for said energizing source to said light associated with said first pushbutton.

5. The electrically interlocking pushbutton circuit with error indication of claim 3, wherein said second pushbutton comprises a first and a second normally open contact, said first normally open contact being included in the energizing circuit for the relay associated with said second pushbutton and being closed when the latter is operated to energize said relay, said second normally open contact being included in the energizing circuit for energizing said lights and being closed when said second pushbutton is operated to prepare said energizing circuit for said lights.

6. The electrically interlocking pushbutton circuit with error indication of claim 5, wherein said relay associated with said second pushbutton comprises a normally open contact included in the energizing circuit for said light associated with said second pushbutton, a first normally closed contact included in the energizing circuit for the relay associated with said first pushbutton and a second normally closed contact included in the energizing circuit from said energizing source to said lights, said relay upon being energized closing said normally open contact to light said light associated with said second pushbutton and opening said first and second normally closed contact to thereby open the energizing circuit for said relay associated with said first pushbutton and the energizing circuit from said energizing source to said light associated with said second pushbutton.

7. The electrically interlocking pushbutton circuit with error indication of claim 6, wherein said energizing source comprises an interrupted source whereby said light associated with said second pushbutton is caused to flash to provide said error indication.

8. The electrically interlocking pushbutton circuit with error indication of claim 7, wherein the energizing circuit from said energizing source to the light associated with said first pushbutton includes said second normally open contacts of both said first and second pushbutton and said second normally closed contact of the relay associated with said first pushbutton.

9. The electrically interlocking pushbutton circuit with error indication of claim 8, wherein the energizing circuit from said energizing source to the light associated with said second pushbutton includes said second normally open contacts of both said first and second pushbutton and said second normally closed contact of the relay associated with said second pushbutton.

* * * * *